E. E. PUNZELT.
FOOD CUTTER.
APPLICATION FILED AUG. 6, 1919.
1,337,955.
Patented Apr. 20, 1920.
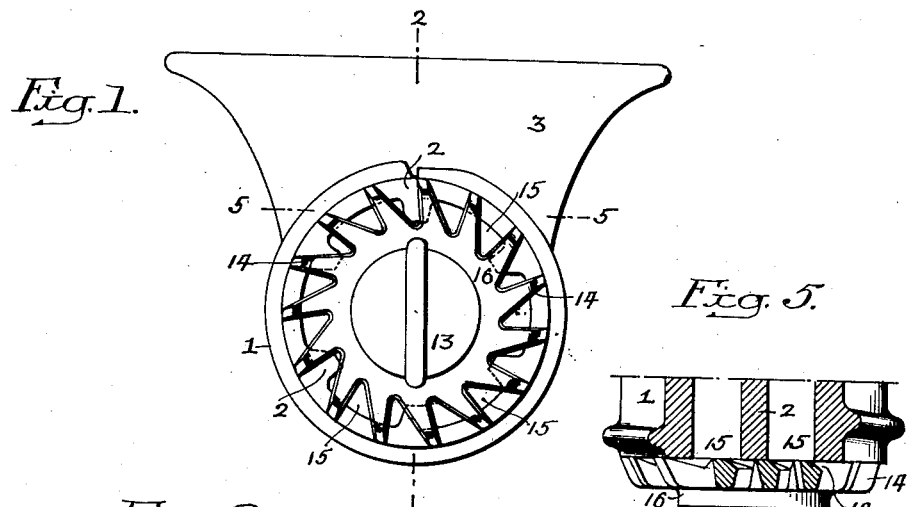
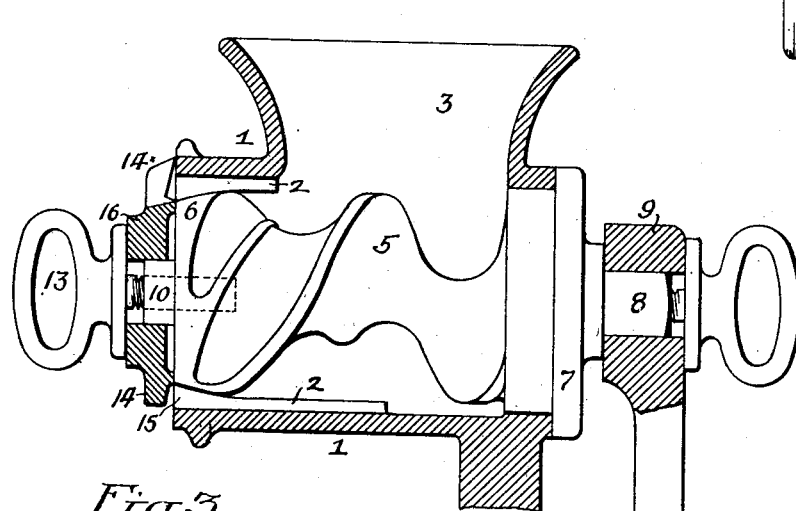
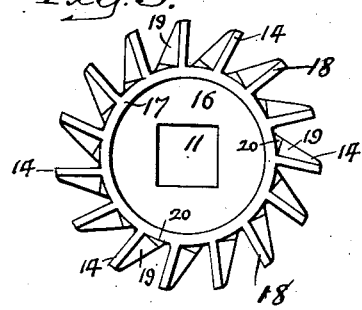
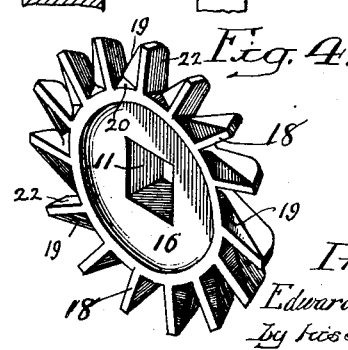
Inventor
Edward E. Punzelt,
by his Attorneys
Howson Howson

UNITED STATES PATENT OFFICE.

EDWARD E. PUNZELT, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

FOOD-CUTTER.

1,337,955. Specification of Letters Patent. Patented Apr. 20, 1920.

Application filed August 6, 1919. Serial No. 315,692.

*To all whom it may concern:*

Be it known that I, EDWARD E. PUNZELT, a citizen of the United States, residing in Philadelphia, Pennsylvania, have invented certain Improvements in Food-Cutters, of which the following is a specification.

My invention relates to certain improvements in the rotating cutters of a food cutting machine so as to insure the accurate cutting of the food and to prevent the choking of the gullet between the cutting blades, insuring an unobstructed passage of the food from the machine and thus increasing the capacity.

My invention is applied to a machine in which the food is forced through the end of a cylindrical casing provided with ribs substantially parallel with the axis of the casing. The projecting portions of the food as they are pressed through the casing between the ribs of the same are cut by a rotating cutter. Heretofore, the rotating cutter would not clear itself so that the tendency was to clog the passages, materially decreasing the output and preventing the cutting of the material to a certain extent.

In the accompanying drawings:

Figure 1 is an end view of the cutter illustrating my invention;

Fig. 2 is a longitudinal sectional view of the food cutter on the line 2—2, Fig. 1;

Fig. 3 is a rear view of the rotating cutting element;

Fig. 4 is a perspective view; and

Fig. 5 is a sectional view on the line 5—5, Fig. 1.

Referring to the drawings, 1 is the casing of a food cutter having ribs 2 and a hopper 3. 5 is a screw having one end slightly tapered at 6 to fit the inwardly beveled ends of the ribs 2 in which such end finds a bearing. The rear end of the screw is mounted in the opposite end of the casing and has a cap flange 7. The screw is provided with a projection 8 to which a handle 9 is secured, whereby the screw may be turned. The tapered end of the screw is provided with a rectangular projection 10 adapted to an opening 11 of similar shape formed in a cutter 12. The projection is internally screw-threaded to receive a set screw 13, which serves to hold the operative edge of the cutter in close contact with the end of the casing. This cutter has a series of projecting blades 14, which pass across the spaces 15 formed between the end of the screw and the ribs 2 of the casing and sever any material that is forced through the same by the screw.

The above describes the general construction of a food cutter to which my invention can be applied.

The main object of my improved cutter is to provide means for positively severing the material as it is projected through the end of the casing and to allow it to clear itself from the cutter so that the gullet between the blades will not be choked and interfere with the free feeding of the material through the casing.

The cutter 12 has a hub section 16 in which the opening 11 is formed. Extending around the outer edge of the hub is a narrow bearing surface 17 from which radiate the cutting edges 18 of the blades 14. The cutting edges are comparatively narrow and the blades are thickened at the rear, as clearly shown in the drawings, so as to give them sufficient strength.

It will be noticed that each blade is beveled at 19 and the hub is slightly beveled at 20. The two bevels are joined on an inclined line, while the front 22 of each blade is inclined to a less degree than the rear 19. Consequently, when the cutter passes the space 15 at the end of the casing, the material is compressed, due to its being forced through the spaces and it is free to expand in the enlarged space between any two of the blades 14 and will pass readily from the same, avoiding the usual choking of the space between the blades, as in other constructions.

While I have shown the cutter with a certain number of blades, the number of blades may be increased or diminished, as desired, according to the material to be cut.

I claim:

1. The combination of a food cutter having a casing with ribs; a screw within the casing and forming, with the ribs, discharge spaces at the end of the casing; a cutter adapted to rotate on the outside of the casing and having a series of radiating blades arranged to pass the spaces between the ribs of the casing, the front of each blade being slightly beveled, while the rear of the blade is beveled at a less degree so as to form a clearance space for cut material to expand in order that the discharge spaces may not be clogged.

2. A cutter for food cutting machines consisting of a hub having an annular face and a series of radial blades extending beyond the face of the hub and disconnected at their outer ends so as to increase the throat, each blade having a narrow cutting face and beveled slightly at the front, while the rear of each blade is beveled at a less degree so as to form a clearance space between each blade to allow for the free expansion of the food after it has been cut.

3. The combination in a food cutter, of a casing having ribs; a hopper; a screw adapted to the casing; means for rotating the screw, the forward end of the screw having a portion extending through the end of the casing; a cutter mounted on the projecting portion of the screw and having a cutting face; and means for forcing the cutter against the end of the casing, said cutter having a narrow, bearing surface at the hub and a series of radiating blades having narrow cutting edges, each blade being beveled back of the cutting edge and said hub being beveled to meet the bevel of the blades so as to allow for the free expansion of the food as it is cut.

EDWARD E. PUNZELT.